US009667739B2

(12) United States Patent
Yoo et al.

(10) Patent No.: US 9,667,739 B2
(45) Date of Patent: May 30, 2017

(54) PROXY-BASED CACHE CONTENT DISTRIBUTION AND AFFINITY

(71) Applicant: MICROSOFT TECHNOLOGY LICENSING, LLC, Redmond, WA (US)

(72) Inventors: Won Suk Yoo, Redmond, WA (US); Nick Holt, Seattle, WA (US); Daniel Vasquez Lopez, Duvall, WA (US); Aniello Scotto Di Marco, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/847,204

(22) Filed: Sep. 8, 2015

(65) Prior Publication Data

US 2015/0381757 A1 Dec. 31, 2015

Related U.S. Application Data

(63) Continuation of application No. 14/096,697, filed on Dec. 4, 2013, now Pat. No. 9,160,805, which is a
(Continued)

(51) Int. Cl.
*G06F 15/167* (2006.01)
*H04L 29/08* (2006.01)
(Continued)

(52) U.S. Cl.
CPC .......... *H04L 67/2842* (2013.01); *H04L 45/44* (2013.01); *H04L 45/58* (2013.01);
(Continued)

(58) Field of Classification Search
None
See application file for complete search history.

(56) References Cited

U.S. PATENT DOCUMENTS 5,251,205 A 10/1993 Callon et al.
5,305,389 A 4/1994 Palmer
(Continued)

FOREIGN PATENT DOCUMENTS

CN 1481635 3/2004
CN 1578320 2/2005
(Continued)

OTHER PUBLICATIONS

"Non-final Office Action Issued in U.S. Appl. No. 13/022,527", Mailed Date: Mar. 22, 2013, 9 Pages.
(Continued)

*Primary Examiner* — Joseph E Avellino
*Assistant Examiner* — Marshall McLeod
(74) *Attorney, Agent, or Firm* — Workman Nydegger (57) ABSTRACT

A distributed caching hierarchy that includes multiple edge routing servers, at least some of which receiving content requests from client computing systems via a load balancer. When receiving a content request, an edge routing server identifies which of the edge caching servers the requested content would be in if the requested content were to be cached within the edge caching servers, and distributes the content request to the identified edge caching server in a deterministic and predictable manner to increase the likelihood of increasing a cache-hit ratio.

20 Claims, 4 Drawing Sheets

US 9,667,739 B2

Page 2

Related U.S. Application Data continuation of application No. 13/022,527, filed on Feb. 7, 2011, now Pat. No. 8,612,550.

(51) Int. Cl.
*H04L 12/721* (2013.01)
*H04L 12/775* (2013.01)

(52) U.S. Cl.
CPC ........ *H04L 67/1021* (2013.01); *H04L 67/288* (2013.01); *H04L 67/2885* (2013.01); *H04L 67/327* (2013.01)

(56) References Cited

U.S. PATENT DOCUMENTS

| | | |
|---|---|---|
| 5,371,852 A | 12/1994 | Attanasio et al. |
| 5,774,660 A | 6/1998 | Brendel et al. |
| 5,892,903 A | 4/1999 | Klaus |
| 5,924,116 A | 7/1999 | Aggarwal et al. |
| 6,061,349 A | 5/2000 | Coile et al. |
| 6,070,191 A | 5/2000 | Narendran et al. |
| 6,249,801 B1 | 6/2001 | Zisapel et al. |
| 6,330,606 B1 | 12/2001 | Logue et al. |
| 6,351,775 B1 | 2/2002 | Yu |
| 6,427,187 B2 | 7/2002 | Malcolm |
| 6,434,620 B1 | 8/2002 | Boucher et al. |
| 6,438,652 B1 | 8/2002 | Jordan et al. |
| 6,470,389 B1 | 10/2002 | Chung et al. |
| 6,490,615 B1 | 12/2002 | Dias et al. |
| 6,496,505 B2 | 12/2002 | La Porta et al. |
| 6,587,431 B1 | 7/2003 | Almulhem et al. |
| 6,615,317 B2 | 9/2003 | Roseborough et al. |
| 6,671,259 B1 | 12/2003 | He et al. |
| 6,704,278 B1 | 3/2004 | Albert et al. |
| 6,732,237 B1 | 5/2004 | Jacobs et al. |
| 6,742,044 B1 | 5/2004 | Aviani et al. |
| 6,779,017 B1 | 8/2004 | Lamberton et al. |
| 6,871,347 B2 | 3/2005 | Hay |
| 6,981,056 B1 | 12/2005 | Aviani et al. |
| 7,024,466 B2 | 4/2006 | Outten et al. |
| 7,039,709 B1 | 5/2006 | Beadle et al. |
| 7,089,328 B1 | 8/2006 | O'Rourke et al. |
| 7,133,905 B2 | 11/2006 | Dilley et al. |
| 7,191,235 B1 | 3/2007 | O'Rourke et al. |
| 7,280,557 B1 | 10/2007 | Biswas et al. |
| 7,292,571 B2 | 11/2007 | Brown |
| 7,324,512 B2 | 1/2008 | Larson et al. |
| 7,383,327 B1 | 6/2008 | Tormasov et al. |
| 7,478,173 B1 | 1/2009 | Delco |
| 7,512,702 B1 | 3/2009 | Srivastava et al. |
| 7,565,423 B1 | 7/2009 | Fredricksen |
| 7,567,504 B2 | 7/2009 | Darling et al. |
| 7,590,736 B2 | 9/2009 | Hydrie et al. |
| 7,613,822 B2 | 11/2009 | Joy et al. |
| 7,685,109 B1 | 3/2010 | Ransil et al. |
| 7,693,050 B2 | 4/2010 | Achlioptas et al. |
| 7,697,557 B2 | 4/2010 | Segel |
| 7,730,262 B2 | 6/2010 | Lowery et al. |
| 7,757,005 B2 | 7/2010 | Larson et al. |
| 7,761,664 B2 | 7/2010 | Gill |
| 7,831,661 B2 | 11/2010 | Makhija |
| 7,886,076 B2 | 2/2011 | Brabson |
| 7,904,562 B2 | 3/2011 | Takase et al. |
| 7,937,438 B1 | 5/2011 | Miller et al. |
| 8,031,713 B2 | 10/2011 | Chang et al. |
| 8,112,545 B1 | 2/2012 | Ong |
| 8,128,279 B2 | 3/2012 | Pryor et al. |
| 8,201,237 B1 | 6/2012 | Doane et al. |
| 8,274,989 B1 | 9/2012 | Allan et al. |
| 8,291,007 B2 | 10/2012 | Orr et al. |
| 8,416,692 B2 | 4/2013 | Patel et al. |
| 8,429,294 B2 | 4/2013 | Bachmann et al. |
| 8,493,851 B2 | 7/2013 | Fan |
| 8,504,556 B1 | 8/2013 | Rice et al. |
| 8,514,878 B1 | 8/2013 | Allan et al. |
| 8,533,343 B1 | 9/2013 | Beda et al. |
| 8,611,349 B1 | 12/2013 | Judge et al. |
| 8,645,508 B1 | 2/2014 | Dickinson et al. |
| 8,751,691 B1 | 6/2014 | Brandwine et al. |
| 8,819,280 B1 | 8/2014 | Liu et al. |
| 8,954,595 B2 | 2/2015 | Sundarrajan et al. |
| 2001/0034752 A1 | 10/2001 | Kremien |
| 2002/0032755 A1 | 3/2002 | Abrahams et al. |
| 2002/0040402 A1 | 4/2002 | Levy-Abegnoli et al. |
| 2002/0059429 A1 | 5/2002 | Carpenter et al. |
| 2002/0078174 A1 | 6/2002 | Sim et al. |
| 2003/0005080 A1 | 1/2003 | Watkins et al. |
| 2003/0026410 A1 | 2/2003 | Lumsden |
| 2003/0031176 A1 | 2/2003 | Sim et al. |
| 2003/0056002 A1 | 3/2003 | Trethewey |
| 2003/0097405 A1 | 5/2003 | Laux et al. |
| 2003/0105903 A1 | 6/2003 | Garnett et al. |
| 2003/0156535 A1 | 8/2003 | Lebizay et al. |
| 2003/0202536 A1 | 10/2003 | Foster et al. |
| 2004/0024853 A1 | 2/2004 | Cates et al. |
| 2004/0030765 A1 | 2/2004 | Zilbershtein et al. |
| 2004/0109447 A1 | 6/2004 | Douglass et al. |
| 2004/0117794 A1 | 6/2004 | Kundu |
| 2004/0162914 A1 | 8/2004 | St. Pierre et al. |
| 2004/0167981 A1 | 8/2004 | Douglas et al. |
| 2004/0172466 A1 | 9/2004 | Douglas et al. |
| 2004/0254943 A1 | 12/2004 | Malcolm |
| 2004/0260745 A1 | 12/2004 | Gage et al. |
| 2005/0055435 A1 | 3/2005 | Gbadegesin et al. |
| 2005/0097185 A1 | 5/2005 | Gibson et al. |
| 2005/0132030 A1 | 6/2005 | Hopen et al. |
| 2005/0149531 A1 | 7/2005 | Srivastava |
| 2005/0188055 A1 | 8/2005 | Saletore |
| 2005/0188065 A1 | 8/2005 | O'Rourke et al. |
| 2005/0198238 A1 | 9/2005 | Sim et al. |
| 2005/0232274 A1 | 10/2005 | Kadambi et al. |
| 2005/0249199 A1 | 11/2005 | Albert et al. |
| 2005/0261985 A1 | 11/2005 | Miller et al. |
| 2006/0002292 A1 | 1/2006 | Chang et al. |
| 2006/0123416 A1 | 6/2006 | Cibrario Bertolotti et al. |
| 2006/0206658 A1 | 9/2006 | Hendel et al. |
| 2006/0294584 A1 | 12/2006 | Sundaram |
| 2007/0055789 A1 | 3/2007 | Claise et al. |
| 2007/0124476 A1 | 5/2007 | Oesterreicher et al. |
| 2007/0165622 A1 | 7/2007 | O'Rourke et al. |
| 2007/0283023 A1 | 12/2007 | Ly et al. |
| 2008/0008202 A1 | 1/2008 | Terrell et al. |
| 2008/0019365 A1 | 1/2008 | Tripathi |
| 2008/0059747 A1 | 3/2008 | Burckart et al. |
| 2008/0104273 A1 | 5/2008 | Bruck et al. |
| 2008/0183854 A1 | 7/2008 | Hopen et al. |
| 2008/0201540 A1 | 8/2008 | Sahita et al. |
| 2008/0222281 A1 | 9/2008 | Dilley et al. |
| 2008/0259917 A1 | 10/2008 | Hua et al. |
| 2008/0288941 A1 | 11/2008 | Adams et al. |
| 2008/0313318 A1 | 12/2008 | Vermeulen et al. |
| 2009/0063706 A1 | 3/2009 | Goldman et al. |
| 2009/0248871 A1 | 10/2009 | Takase et al. |
| 2009/0276607 A1 | 11/2009 | Bonola |
| 2010/0017519 A1 | 1/2010 | Han et al. |
| 2010/0036903 A1 | 2/2010 | Ahmad et al. |
| 2010/0036954 A1 | 2/2010 | Sakata et al. |
| 2010/0057898 A1 | 3/2010 | Imai |
| 2010/0080226 A1 | 4/2010 | Khalid et al. |
| 2010/0095008 A1 | 4/2010 | Joshi |
| 2010/0185817 A1 | 7/2010 | Magenheimer |
| 2010/0218254 A1 | 8/2010 | Gray et al. |
| 2010/0257263 A1 | 10/2010 | Casado et al. |
| 2010/0268764 A1 | 10/2010 | Wee et al. |
| 2010/0274890 A1 | 10/2010 | Patel et al. |
| 2010/0302940 A1 | 12/2010 | Patel et al. |
| 2010/0318609 A1 | 12/2010 | Lahiri et al. |
| 2010/0322088 A1 | 12/2010 | Muthiah et al. |
| 2010/0322250 A1 | 12/2010 | Shetty et al. |
| 2010/0332595 A1 | 12/2010 | Fullagar et al. |
| 2011/0019531 A1 | 1/2011 | Kim et al. |
| 2011/0023029 A1 | 1/2011 | Diab et al. |
| 2011/0023114 A1 | 1/2011 | Diab et al. |
| 2011/0222535 A1 | 9/2011 | Suganthi et al. |

(56) References Cited

U.S. PATENT DOCUMENTS

| | | |
|---|---|---|
| 2011/0225231 A1 | 9/2011 | Bansal et al. |
| 2011/0235508 A1 | 9/2011 | Goel et al. |
| 2011/0267947 A1 | 11/2011 | Dhar et al. |
| 2011/0276695 A1 | 11/2011 | Maldaner |
| 2011/0317554 A1 | 12/2011 | Greenberg et al. |
| 2012/0099601 A1 | 4/2012 | Haddad et al. |
| 2012/0155266 A1 | 6/2012 | Patel et al. |
| 2012/0185557 A1 | 7/2012 | Di Marco et al. |
| 2012/0203866 A1 | 8/2012 | Yoo et al. |
| 2012/0207174 A1 | 8/2012 | Shieh |
| 2012/0246637 A1 | 9/2012 | Kreeger et al. |
| 2012/0303809 A1 | 11/2012 | Patel et al. |
| 2013/0148505 A1 | 6/2013 | Koponen et al. |
| 2013/0159487 A1 | 6/2013 | Patel et al. |
| 2013/0301413 A1 | 11/2013 | Moen et al. |
| 2014/0006681 A1 | 1/2014 | Chen et al. |
| 2014/0019602 A1 | 1/2014 | Murthy et al. |
| 2014/0029430 A1 | 1/2014 | Samuels et al. |
| 2014/0095649 A1 | 4/2014 | Yoo et al. |
| 2014/0108655 A1 | 4/2014 | Kumar et al. |
| 2014/0115135 A1 | 4/2014 | Allan et al. |
| 2014/0149794 A1 | 5/2014 | Shetty et al. |
| 2014/0185446 A1 | 7/2014 | Patel et al. |
| 2014/0351395 A1 | 11/2014 | Murthy et al. |
| 2015/0063115 A1 | 3/2015 | Patel et al. |
| 2016/0026505 A1 | 1/2016 | Murthy et al. |
| 2016/0105499 A1 | 4/2016 | Kumar et al. |

FOREIGN PATENT DOCUMENTS

| | | |
|---|---|---|
| CN | 102436401 | 5/2012 |
| JP | 2002288038 | 10/2002 |
| JP | 2011041006 | 2/2011 |

OTHER PUBLICATIONS

"Notice of Allowance Issued in U.S. Appl. No. 13/006,694", Mailed Date: Nov. 20, 2012, 9 Pages.

"Notice of Allowance Issued in U.S. Appl. No. 13/022,527", Mailed Date: Aug. 20, 2013, 8 Pages.

"Final Office Action Issued in U.S. Appl. No. 14/096,697", Mailed Date: Feb. 13, 2015, 11 Pages.

"Non-final Office Action Issued in U.S. Appl. No. 13/006,694", Mailed Date: Aug. 28, 2012, 17 Pages.

"Non-final Office Action Issued in U.S. Appl. No. 14/096,697", Mailed Date; Jul. 22, 2014, 19 Pages.

"Notice of Allowance Issued in U.S. Appl. No. 14/096,697", Mailed Date: Jun. 16, 2015, 6 Pages.

Das, et al., "Predicting Web Cache Behavior using Stochastic State-Space Models", In Proceedings of the Second International Workshop on Scalable Data Management Applications and Systems, Jul. 2008, 8 Pages.

Gill, Binny S., "On Multi-Level Exclusing Caching: Offline Optimality and Why Promotions are Better Than Demotions", In Proceedings of the 6th USENIX Conference on File and Storage Technologies, Article No. 4, Feb. 26, 2008, pp. 49-65.

Gulwani, et al., "WebCaL—A Domain Specific Language for Web Caching", In Journal of Computer Communications, vol. 24, Issue 2, Feb. 1, 2001, 13 Pages.

Laoutaris, et al., "The Cache Inference Problem and Its Application to Content and Request Routing", In Proceedings of 26th IEEE International Conference on Computer Communication, INFOCOM 2007, May 6, 2007, 10 Pages.

Lindemann, et al., "Evaluating Cooperative Web Caching Protocols for Emerging Network Technologies", In Proceedings of International Workshop on Caching, Coherence and Consistency, Jun. 2001, 9 Pages.

Naumenko, Andrey, "Some Recommendations on Building Proxy Caching Service", In Proceedings of WebNet 98—World Conference of the WWW, Internet and Intranet, Nov. 1998, 6 Pages.

Wessels, et al., "ICP and the Squid Web Cache", In Proceedings of IEEE Journal on Selected Areas in Communications, Aug. 13, 1997, 25 Pages.

Greenberg, et al., "Towards a Next Generation Data Center Architecture: Scalability and Commoditization", In Proceedings of the ACM Workshop on Programmable Routers for Extensible Services of Tomorrow, Aug. 17-22, 2008, pp. 57-62.

Alur, Sandeep J., "Enterprise Integration and Distributed Computing: A Ubiquitous Phenomenon", Published: Sep. 2008. Available at: http://msdn.microsoft.com/en-us/library/cc949110.aspx.

Joseph, et al., "A Policy-Aware Switching Layer for Data Centers", In Proceedings of the ACM SIGCOMM Conference on Data Communication, Aug. 17, 2008, pp. 51-62.

Al-Fares, et al., "Hedera: Dynamic Flow Scheduling for Data Center Networks", In Proceedings of the 7th USENIX Conference on Networked Systems Design and Implementation, Apr. 28, 2010, pp. 281-295.

Stage, et al., "Network-aware Migration Control and Scheduling of Differentiated Virtual Machine Workloads", In Workshop on Software Engineering Challenges in Cloud Computing, May 23, 2009, pp. 9-14.

"Load Balancing: Optimum Performance, Scalability and Resiliency", Available at least as early as Apr. 20, 2012, available at: http://www.contegix.com/solutions/managed-hosting/managed-services/load-balancing/.

Nehra, Neeraj, et al., "A Framework for Distributed Dynamic Load Balancing in Heterogeneous Cluster", Journal of Computer Science 3 (1): Jan. 2007 Science Publications, pp. 14-24.

Bunt, Richard B., et al., "Achieving Load Balance and Effective Caching in Clustered Web Servers", Proceedings of the Fourth International Web Caching Workshop, San Diego, CA, Apr. 1999, pp. 159-169.

K2 Colocation, Network Load Balancing Appliance, Intelligent Routing Network Appliance, "Flow Control Platform (FCP) Solutions", Jan. 4, 2007, 2 pages.

White Paper, Equalizer, "Purpose-Built Load Balancing the Advantages of Coyote Point Equalizer over Software-based Solutions", Copyright 2004 Coyote Point Systems, Inc. 9 pages.

Microsoft TechNet, "MS Windows NT Load Balancing Service Whitepaper", Based on information and belief available, at least as early as Jul. 27, 2010, 9 pages.

HAProxy, "The Reliable, High Performance TCP/HTTP Load Balancer", Jul. 28, 2010, 10 pages.

Top Web Hosting, "Load Balancing", Copyright 2002-2010, Based on information and belief available ast least as early as Jul. 27, 2010, 6 pages.

Walcott, Costa, "Taking a load off: Load balancing with balance", Aug. 17, 2005, 7 pages.

InfoBPN Solutions on Business Process Networking Business and Process Automation, "Application Load Balancing Solution", Based on information and belief available, at least as early as Jul. 27, 2010.

First Office Action Received for Chinese Application No. 201110444322.1, Mailed Date: Sep. 3, 2014, 12 Pages.

Second Office Action Issued in Chinese Patent Application No. 201110444322.1, Mailed Date: Apr. 9, 2015, 6 Pages.

International Search Report and Written Opinion Issued in PCT Application No. PCT/US2013/065159, mailed Jan. 22, 2014.

"Effects of Virtualization and Cloud Computing on Data Center Networks", Retrieved from <<http://web.archive.org/web/20121127070451/http://h20000.www2.hp.com/bc/docs/support/SupportManual/c03042885/c03042885.pdf>>, Oct. 2011, 16 Pages.

U.S. Appl. No. 13/547,805, Jan. 3, 2014, Office Action.
U.S. Appl. No. 12/972,340, Feb. 25, 2013, Office Action.
U.S. Appl. No. 12/972,340, Dec. 18, 2013, Notice of Allowance.
U.S. Appl. No. 13/115,444, Apr. 15, 2013, Office Action.
U.S. Appl. No. 13/115,444, Sep. 13, 2013, Office Action.
U.S. Appl. No. 13/115,444, Jan. 30, 2014, Office Action.
U.S. Appl. No. 12/972,340, Feb. 14, 2014, Notice of Allowance.
U.S. Appl. No. 13/547,805, Apr. 14, 2014, Notice of Allowance.
U.S. Appl. No. 14/198,465, Dec. 5, 2014, Office Action.
U.S. Appl. No. 14/452,314, Mar. 24, 2015, Notice of Allowance.
U.S. Appl. No. 14/198,465, Sep. 3, 2015, Office Action.
U.S. Appl. No. 14/804,381, Feb. 10, 2016, Notice of Allowance.

(56) References Cited

OTHER PUBLICATIONS

U.S. Appl. No. 14/546,729, May 24, 2016, Notice of Allowance.
U.S. Appl. No. 13/652,718, Oct. 9, 2014, Office Action.
U.S. Appl. No. 13/652,718, Mar. 5, 2015, Office Action.
U.S. Appl. No. 13/652,718, Oct. 20, 2015, Notice of Allowance.
U.S. Appl. No. 13/652,718, Sep. 18, 2015, Notice of Allowance.
Chinese Office Action issued in Chinese Patent Application No. 201380054147.2 mailed Mar. 20, 2017.

PROXY-BASED CACHE CONTENT DISTRIBUTION AND AFFINITY

CROSS-REFERENCE TO RELATED APPLICATIONS

This application is a continuation of U.S. patent application Ser. No. 14/096,697 filed on Dec. 4, 2013, entitled "PROXY-BASED CACHE CONTENT DISTRIBUTION AND AFFINITY," which is a continuation of U.S. patent application Ser. No. 13/022,527 filed on Feb. 7, 2011, entitled "PROXY-BASED CACHE CONTENT DISTRIBUTION AND AFFINITY," which issued as U.S. Pat. No. 8,612,550 on Dec. 17, 2013, and which application is expressly incorporated herein by reference in its entirety.

BACKGROUND

Content distribution networks are used to deliver all types of content from origin servers to client computing systems. To efficiently deliver such content, distributed cache hierarchies intervene between origin servers and client computing systems. When a client issues a request for content, if the content is available in the hierarchy, the content may often be provided by the hierarchy rather than having to obtain the content all the way from the origin server, provided that the content is found in the hierarchy.

In many cases, the cache hierarchy is partitioned in such a way that content items are cached mutually exclusively with one another, while providing a way to route the requests accordingly and expectedly to find the cached content. Therefore, when a request is routed to a cache server, the cache content is expected to be cached by that cache server and it would likely result in a cache hit, meaning the requested content is cached by that cache server and thus the cache server may satisfy the content request directly. One way to do this is to perform such cache distribution and predictive routing at the edge caching tier (in a cache hierarchy, this would be the first tier of cache servers geographically closest to the client).

A conventional way for a client to determine a location of cached content in an edge caching tier is for the client to first provide the Uniform Resource Locator (URL) of the desired content to an intelligent Domain Name Server (DNS) server. The intelligent DNS server knows the geographic proximity of the cached content, and provides an Internet Protocol (IP) address of a cache server that would perform well for the client. The client then requests the content using the IP address provided by the intelligent DNS server.

BRIEF SUMMARY

At least one embodiment described herein relates to a distributed caching hierarchy that includes multiple edge routing servers, at least some of which receive content requests from client computing systems via a load balancer. When receiving a content request, an edge routing server identifies which of the edge caching servers is responsible for caching the requested content in a predictable manner. Once the appropriate caching server has been identified, the edge routing server routes the content request to the appropriate caching server to maximize the likelihood of a cache hit. The edge routing server and the edge caching server can be in one physical server in a cache hierarchy, although that is not required.

In accordance with at least one embodiment described herein, when the edge caching server receives the content request, the edge caching server determines whether the edge caching server has the content cached. If so, the edge caching server initiates return of the requested content to the client. If not, the edge caching server identifies which of the next tier caching servers is responsible for the requested content in a predictable manner and routes the now cache-missed content request to the appropriate next tier caching server. This continues potentially all the way up the distributed caching hierarchy until, if necessary, the origin server is reached. When the next tier caching server receives the requested content, it caches the requested content, and then initiates return of the requested content to the client.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a distributed caching hierarchy includes multiple edge routing servers, at least some of which receiving content requests from client computing systems via a load balancer. When receiving a content request, an edge routing server identifies which of the edge caching servers is responsible for the requested content in a predictable manner and routes the now cache-missed content request to the identified next tier caching server. First, some introductory discussion regarding computing systems will be described with respect to FIG. 1. Then, the embodiments of the distributed caching network and its example operation will be described with respect to subsequent figures.

Figure 1:
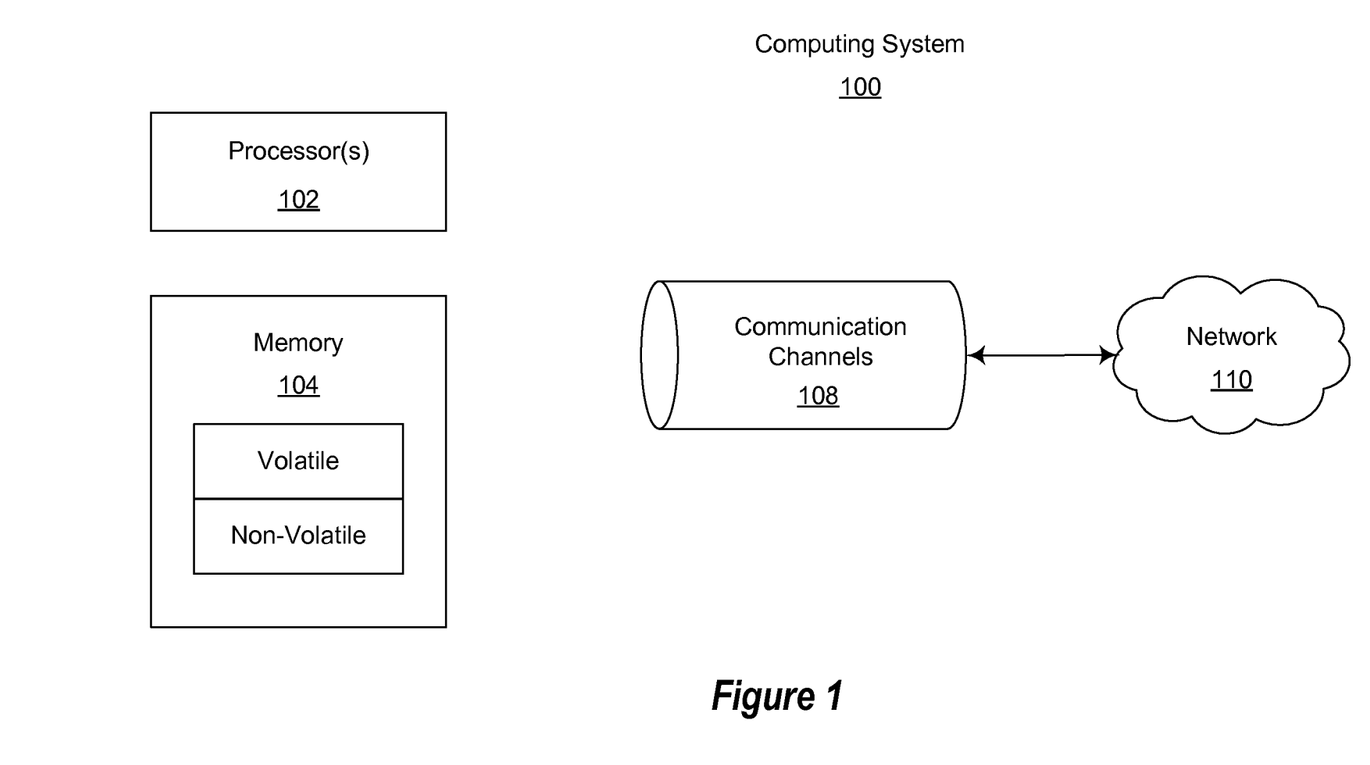
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems. As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
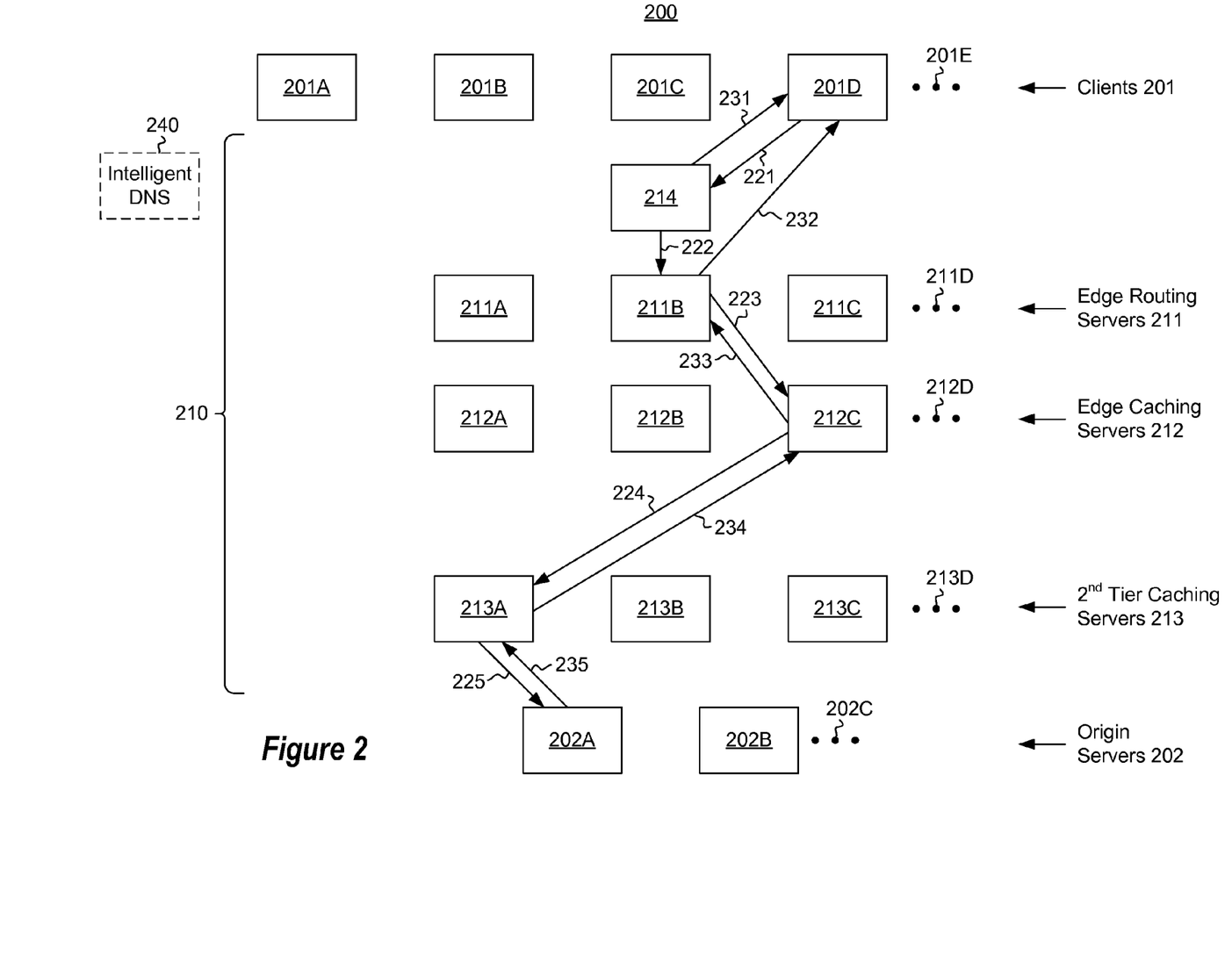
FIG. 2 illustrates a network that includes a distributed cache hierarchy.

FIG. 2 illustrates a network that includes a distributed cache hierarchy. The network 200 includes a number of client computing systems 201A, 201B, 201C and 201D (collectively referred to as clients 201) and a plurality of origin server computing systems 202A and 202B (collectively referred to as origin servers 202) with a cache hierarchy 210 disposed therebetween.

The "origin" server is the server that originally sources the content. Although content is available on the origin servers 202, that content may often be available within the cache hierarchy 210 when requested by one of the clients 201. The ellipses 201E represent that there may be any number of clients within the network, and that the number of clients need not be static. The ellipses 202C represents that there may be any number or origin servers within the network, and again that the number of origin servers need not be static. Each of the clients 201 and origin servers 202 may be structured as described above for the computing system 100.

The example cache hierarchy 210 includes a tier of edge routing servers 211A, 211B and 211C (collective referred to as edge routing servers 211), a tier of edge caching servers 212A, 212B and 212C (collective referred to as edge caching servers 212) and a second tier of caching servers 213A, 213B, and 213C (collectively referred to as second tier caching servers 213). The edge routing servers 211 may perhaps not actually cache content, but instead they identify the edge cache server for the requested content in a predictable manner to increase the likelihood of a cache-hit. In addition, the edge routing server and the edge caching server are logical roles. These roles could be served by the same physical server in the hierarchy. The edge cache servers and the second tier cache servers actually cache content.

A load balancer 214 receives content requests from the clients 201 and distributes the content request to one of the edge routing servers 211 in accordance with a load balancing algorithm. The load balancer 214 may also monitor a status of edge routing servers 211 and avoid distributed content requests to edge routing servers that are not healthy enough to sufficiently operate on such requests. The requested content may be video, images, files, sound, music, collaborative authoring content, or any other content.

While the load balancer is a good solution to provide both high availability and scalability, it does not have any awareness of where in the cache hierarchy the requested content resides. This is inefficient when it comes to routing requests for cached contents because its load balancing algorithm does not help to maximize the likeliness of getting a cache hit. The principles described herein reduce the impact of this inefficiency since the edge routing servers more predictably route the content requests to the edge caching servers. Because the edge routing servers can determine which edge caching server is responsible for caching the requested content, by routing the request to the responsible server, it can increase the cache-hit ratio.

The example cache hierarchy 210 is kept simple for clarity in explaining the principles described herein. An actual cache hierarchy may have any number of tiers of cache servers intermediating between the origin servers 202 and the clients 201. The cache hierarchy 210 may, in fact, be distributed across the Internet. Furthermore, the ellipses 211D, 212D and 213D represent that there may be any number of edge routing servers, edge caching servers, and second tier caching servers. The number of edge routing servers need not be the same as the number of caching servers in any tier, and vice versa. In one embodiment, at least one, but potentially all, of the edge routing servers may be on the same machine as a respective edge caching server. For instance, edge routing server 211A may be on the same machine as edge caching server 212A, edge routing server 211B may be on the same machine as edge caching server 212B, and/or edge routing server 211C may be on the same machine as edge caching server 213C, although not required. Each of the servers in the distributed cache hierarchy 210 may be structured as described above for the computing system 100 of FIG. 1.

Figure 3:
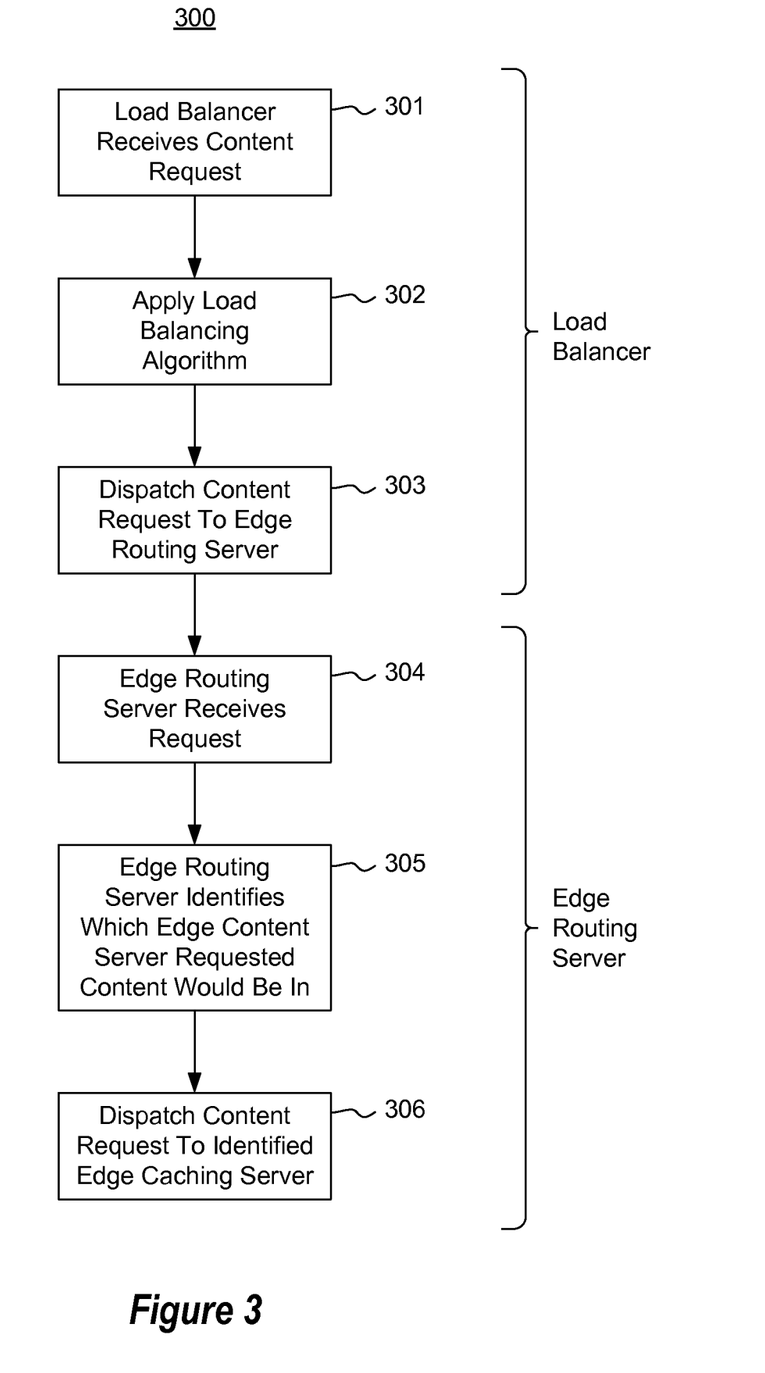
FIG. 3 illustrates a flowchart of a method for managing a distributed cache hierarchy in a network from the viewpoint of a load balancer and a tier of edge routing servers.

FIG. 3 illustrates a flowchart of a method 300 for managing a distributed cache hierarchy in a network. While the method 300 may be performed in any network having a tier of edge routing servers and at least one tier of edge caching servers, the method 300 will now be described with respect to the network 200 of FIG. 2. Specifically, the arrows in FIG. 2 represent the communications associated with a specific content request.

The load balancer receives the content request (act 301), and applies a load balancing algorithm to determine which edge routing server should handle the content request (act 302). The load balancer then distributes the content request to the corresponding edge routing server (act 303). The precise load balancing algorithm is not critical to the principles described herein and may be random, round robin, or any other load balancing algorithm because these algorithms do not have awareness of which server is responsible for caching particular content. Referring to FIG. 2, the load balancer 214 receives the content requested as represented by arrow 221. The load balancer 214 determines that the edge routing server to route the content request to. In the illustrated case, the load balancer 214 routes the content request to the edge routing server 211B as represented by arrow 222.

The edge routing server receives the content request from the load balancer (act 304) (also as represented by the arrow 222), the edge routing server identifies which of the edge caching servers the requested content would be in if the requested content were to be cached within the edge caching servers (act 305). For example, the edge routing server 211B may apply the Cache Array Routing Protocol (CARP) using the Uniform Resource Locator (URL) to identify the corresponding edge caching server. The edge routing server does not itself cache the requested content. Accordingly, the edge routing server dispatches the content request to the identified edge caching server (act 306). Referring to FIG. 2, for example, the edge routing server 211B routes the content request to the corresponding edge caching server 212C as represented by arrow. Any of the other edge routing servers 211 of FIG. 2 may behave the same way with respect to routing to edge caching servers 212 that are appropriate given the URL of the content request.

In one embodiment, in addition to routing the requests in a predictable manner, the edge routing servers also routes the requests in a way that the cached contents on the edge cache servers are mutually exclusive. For instance, if edge routing server 212A is responsible for caching a particular content, then the same content is not cached by another other edge caching server 212. This behavior allows the cache hierarchy operator to distribute the contents in a way that there are no duplicated cached contents in the cache hierarchy, and therefore can more efficiently use resources, which would have otherwise been wasted by caching duplicate contents.

Figure 4:
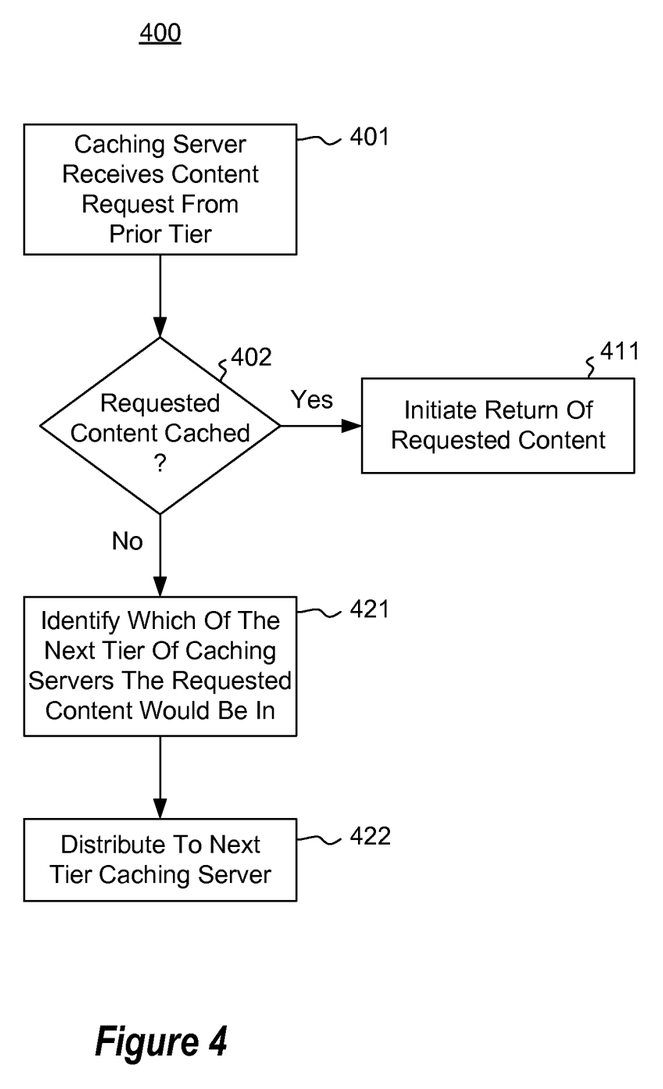
FIG. 4 illustrates a flowchart of a method for managing a distributed cache hierarchy in a network from the viewpoint of a tier of edge caching servers.

FIG. 4 illustrates a flowchart of a method 400 for a caching server at any tier in the distributed cache hierarchy to handle requests from the prior tier in the distributed cache hierarchy. For instance, if the caching server was an edge caching server amongst the edge caching servers 212, the edge caching server would perform the method 400 in response to receiving a content request from an edge routing server of the edge routing servers 211. If the caching server was a second tier caching server of the second tier caching servers 213, the second tier caching server would perform the method 400 in response to receiving the content request from an edge caching server of the edge content servers 212, and so forth for subsequent tiers.

Applying method 400 first to the edge caching server tier, the edge caching server receives the content request from prior tier in the distributed cache hierarchy (act 401), which would be the edge routing server in the case where the method 400 is applied to the edge caching server tier. For instance, in the example of FIG. 2, the edge caching server 212C receives the content request from the edge routing server 211B as also represented by arrow 223.

The edge caching server determines whether the requested content is cached on the edge caching server (decision block 402). If the requested content is cached in the edge caching server (Yes in decision block 402), the edge caching server initiates return of the requested content (act 411) to a client computing system associated with the content request. Referring to FIG. 2, if the edge caching server 212C had the requested content, the requested content would be returned along the reverse path along arrow 233 and arrow 232 in sequence to the client 201D.

If the requested content is not cached in the edge caching server (No in decision block 402), the edge caching server identifies which of the next tier of caching servers the requested content would be in (act 421) if the requested content were to be cached within the next tier caching servers. The content request is then distributed to the identified next tier caching server (act 422). For instance, if the requested content were not in the edge caching server 212C, the content request would be dispatched to the identified next tier caching server. In the illustrated case, the CARP algorithm may be applied by the edge caching server to identify that the requested content would be cached by the second tier caching server 213A if the requested content were cached by one of the second tier caching servers 213. The method 400 would then be performed for the next tier caching server.

Applying method 400 next to the second tier caching servers, the second tier caching server receives the content request from prior tier in the distributed cache hierarchy (act 401), which would be the edge caching server in the case where the method 400 is applied to the second tier caching server tier. For instance, in the example of FIG. 2, the second tier caching server 213A receives the content request from the edge caching server 212C as also represented by arrow 224.

The second tier caching server determines whether the requested content is cached on the second tier caching server (decision block 402). If the requested content is cached in the second tier caching server (Yes in decision block 402), the second tier caching server initiates return of the requested content (act 411) to a client computing system associated with the content request. Referring to FIG. 2, if the second tier caching server 213A had the requested content, the requested content would be returned along the reverse path along arrow 234, arrow 233 and arrow 232 in sequence to the client 201D. While on the return path the requested content may perhaps be cached at the edge caching server 212C. Although the requested content might always be cached in the edge caching servers encountered in the return path, caching policy might also be applied in order to determine whether to cache the returned content.

If the requested content is not cached in the second tier caching server (No in decision block 402), the second tier caching server identifies which of the next tier of caching servers the requested content would be in (act 421) if the requested content were to be cached within the next tier caching server. In this case, the next tier would actually be the origin servers 202. The content request is then distributed to the identified next tier caching server (act 422). For instance, if the requested content were not in the second tier caching server 213A, the content request would be dispatched to the identified next tier caching server. In this case, the origin server 202A may be identified based on the URL itself. The origin server 202A would then return the requested content along the reverse path along arrow 235 (thereupon being potentially cached in second tier caching server 213A), along arrow 234 (thereupon being potentially cached in edge caching server 212C), along arrow 233 and along arrow 232.

Accordingly, an effective mechanism for managing a distributed cache hierarchy is described. The mechanism provides predictability in where the content request should be dispatched, while also providing increased hit rate for caching servers. FIG. 2 also shows an intelligent Domain Name Server (DNS) server 240 to represent that the presence of the principles described with respect to FIGS. 3 and 4 are not inconsistent with the use of an intelligent DNS server. Some of the content requests may still be dispatched to the intelligent DNS server 440 for handling in accordance with the prior art.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A distribution network for retrieving cached content comprising:
   a load balancer that receives requests from one or more client computing systems and, without being aware of where any content corresponding to the content requests may reside in the distribution network, the load balancer routing said content requests to one or more edge caching servers;
   a plurality of edge caching servers each comprising:
      an edge caching unit having at least one hardware processor and memory for caching content obtained from one or more origin servers; and
      an edge routing unit which receives content requests from the load balancer, the edge routing unit comprising at least one hardware processor and memory containing computer-executable instructions which, when implemented, cause the edge routing unit to process one or more content requests received from the load balancer according to a computer-implemented predictive routing protocol which predicts where cached content corresponding to requested content resides in the distribution network, and wherein the computer-implemented predictive routing protocol comprises acts of:
         identifying which of the plurality of edge caching servers is correlated to the requested content based on the predictive routing protocol; and
         routing the content request to the identified edge caching server without having to first determine whether the edge routing server contains the requested content.

2. The distribution network in accordance with claim 1, wherein the edge routing unit sends the given content request to a particular edge caching server and the edge caching unit of the particular edge caching server determines whether the edge caching unit of the particular edge caching server has the requested content cached.

3. The distribution network in accordance with claim 2, wherein the edge caching unit initiates of the particular edge caching server return of the requested content to a client computing system from which the given content request was sent.

4. The distribution network in accordance with claim 1, wherein the edge routing unit sends the given content request to a particular edge caching server and the edge caching unit of the particular edge caching server determines that the edge caching unit of the particular edge caching server does not have the requested content, and wherein an edge routing unit of the particular caching server then identifies, based on the predictive routing protocol, which other of the plurality of edge caching servers the given content request would be in, and the given content request is then sent from the particular edge caching server to said identified other of the plurality of edge caching servers.

5. The distribution network in accordance with claim 1, wherein the edge routing unit sends the given content request to a particular edge caching server and the edge caching unit of the particular edge caching server determines that the edge caching unit of the particular edge caching server does not have the requested content, and wherein the edge routing unit probabilistically identifies a further tier of edge caching servers at which the given content request would likely be cached, and
the given content request is then routed to one of the edge servers in the identified next tier of edge caching servers.

6. The distribution network of claim 1, wherein the load balancer routes the content requests based at least in part on a health status associated with each of the edge routing units.

7. The distribution network of claim 1, wherein each edge routing unit is configured to refrain from caching content.

8. The distribution network of claim 1, wherein each of the edge caching units caches mutually exclusive sets of cached content from one another.

9. The distribution network of claim 1, wherein the edge routing unit and the one edge caching unit of at least one edge caching server reside on a common computing device.

10. A computer-implemented method for retrieving cached content from a hierarchy of edge caching servers, the computer-implemented method being performed by one or more processors executing computer executable instructions for the computer-implemented method, and the computer-implemented method comprising:
receiving at a load balancer one or more requests from one or more client computing systems;
without being aware of where any content corresponding to content requests may reside in the distribution network, the load balancer routing said content requests to one or more edge caching servers;
a plurality of the edge caching servers each comprising an edge caching unit having at least one hardware processor and memory for caching content obtained from one or more origin servers, and an edge routing unit, and wherein the computer implemented method further comprises:
receiving at one or more edge routing units, content requests from the load balancer;
each edge routing unit comprising at least one hardware processor and memory containing computer-executable instructions which, when implemented, cause the edge routing unit to process one or more content requests received from the load balancer according to a computer-implemented predictive routing protocol which predicts where cached content corresponding to requested content resides in the distribution network, and wherein the computer-implemented predictive routing protocol comprises acts of:
identifying which of the plurality of edge caching servers is correlated to the requested content based on the predictive routing protocol; and
routing the content request to the identified edge caching server without having to first determine whether the edge routing server contains the requested content.

11. The computer-implemented method in accordance with claim 10, wherein the edge routing unit sends the given content request to a particular edge caching server and the edge caching unit of the particular edge caching server determines whether the edge caching unit of the particular edge caching server has the requested content cached.

12. The computer-implemented method in accordance with claim 11, wherein the edge caching unit initiates of the particular edge caching server return of the requested content to a client computing system from which the given content request was sent.

13. The computer-implemented method in accordance with claim 11, wherein the edge routing unit sends the given content request to a particular edge caching server and the edge caching unit of the particular edge caching server determines that the edge caching unit of the particular edge caching server does not have the requested content, and wherein an edge routing unit of the particular caching server then identifies, based on the predictive routing protocol, which other of the plurality of edge caching servers the given content request would be in, and the given content request is then sent from the particular edge caching server to said identified other of the plurality of edge caching servers.

14. The computer-implemented method in accordance with claim 10, wherein the edge routing unit sends the given content request to a particular edge caching server and the edge caching unit of the particular edge caching server determines that the edge caching unit of the particular edge caching server does not have the requested content, and wherein the edge routing unit probabilistically identifies a further tier of edge caching servers at which the given content request would likely be cached, and the given content request is then routed to one of the edge servers in the identified next tier of edge caching servers.

15. The computer-implemented method of claim 10, wherein the load balancer routes the content requests based at least in part on a health status associated with each of the edge routing units.

16. The computer-implemented method of claim 10, wherein each edge routing unit is configured to refrain from caching content.

17. The computer-implemented method of claim 10, wherein each of the edge caching units caches mutually exclusive sets of cached content from one another.

18. The computer-implemented method of claim 10, wherein the edge routing unit and the one edge caching unit of at least one edge caching server reside on a common computing device.

19. One or more hardware storage devices containing computer-executable instructions which, when executed by one or more processors, cause the one or more processors to perform a computer-implemented method for retrieving cached content from a hierarchy of edge caching servers, and wherein the computer-implemented method comprises: receiving at a load balancer one or more requests from one or more client computing systems; without being aware of where any content corresponding to content requests may reside in the distribution network, the load balancer routing said content requests to one or more edge caching servers; a plurality of the edge caching servers each comprising an edge caching unit having at least one hardware processor and memory for caching content obtained from one or more origin servers, and an edge routing unit, and wherein the computer implemented method further comprises: receiving at one or more edge routing units, content requests from the load balancer; each edge routing unit comprising at least one hardware processor and memory containing computer-executable instructions which, when implemented, cause the edge routing unit to process one or more content requests received from the load balancer according to a computer-implemented predictive routing protocol which predicts where cached content corresponds to requested content resides in the distribution network, and wherein the computer-implemented predictive routing protocol comprises acts of: identifying which of the plurality of edge caching servers is correlated to the requested content based on the predictive routing protocol; and routing the content request to the identified edge caching server without having to first determine whether the edge routing server contains the requested content.

20. The one or more hardware storage devices of claim 19, wherein the edge routing unit sends the given content request to a particular edge caching server and the edge caching unit of the particular edge caching server determines that the edge caching unit of the particular edge caching server does not have the requested content, and wherein an edge routing unit of the particular caching server then identifies, based on the predictive routing protocol, which other of the plurality of edge caching servers the given content request would be in, and the given content request is then sent from the particular edge caching server to said identified other of the plurality of edge caching servers.

* * * * *